United States Patent
Wu

(10) Patent No.: US 10,007,331 B2
(45) Date of Patent: Jun. 26, 2018

(54) WEARABLE INTELLIGENT SYSTEMS AND INTERACTION METHODS THEREOF

(71) Applicants: Semiconductor Manufacturing International (Beijing) Corporation, Beijing (CN); Semiconductor Manufacturing International (Shanghai) Corporation, Shanghai (CN)

(72) Inventor: Qiang Wu, Shanghai (CN)

(73) Assignees: SEMICONDUCTOR MANUFACTURING INTERNATIONAL (BEIJING) CORPORATION, Beijing (CN); SEMICONDUCTOR MANUFACTURING INTERNATIONAL (SHANGHAI) CORPORATION, Shanghai (CN)

( * ) Notice: Subject to any disclaimer, the term of this patent is extended or adjusted under 35 U.S.C. 154(b) by 124 days.

(21) Appl. No.: 14/569,860

(22) Filed: Dec. 15, 2014

(65) Prior Publication Data
US 2015/0185828 A1   Jul. 2, 2015

(30) Foreign Application Priority Data
Dec. 27, 2013   (CN) .......................... 2013 1 0741185

(51) Int. Cl.
*G06F 3/01* (2006.01)
*G02B 27/00* (2006.01)
*G02B 27/01* (2006.01)

(52) U.S. Cl.
CPC .......... *G06F 3/011* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 4,969,714 A * 11/1990 Fournier, Jr. .......... A42B 3/042
345/8
5,357,293 A * 10/1994 Uomori .................. A61B 3/113
351/201
(Continued)

FOREIGN PATENT DOCUMENTS

| CN | 101395868 A | 3/2009 |
|---|---|---|
| CN | 103018905 A | 4/2013 |
| CN | 103376553 A | 10/2013 |

*Primary Examiner* — Kent W Chang
*Assistant Examiner* — Nathaniel P Brittingham
(74) *Attorney, Agent, or Firm* — Anova Law Group, PLLC

(57) ABSTRACT

A wearable intelligent system is provided. The system includes a frame; and a micro projector disposed on the frame configured to project an image interface onto a beam splitter. The system also includes the beam splitter disposed on the frame configured to receive the image interface and form a virtual image in a user's eye; and a position sensor disposed on the front of the frame configured to sense a position of at least a body part and a change mode of the position with time and convert the change mode of the position into operation commands and the position into a position data. Further, the system includes a central data hub disposed on the frame configured to at least receive the position data and the operation commands and adjust the image interface to match the part of the user's body and perform corresponding operations according to the position data.

20 Claims, 7 Drawing Sheets

(52) U.S. Cl.
CPC ........ *G06F 3/017* (2013.01); *G02B 2027/014* (2013.01); *G02B 2027/0178* (2013.01); *G02B 2027/0187* (2013.01)

(56) References Cited

U.S. PATENT DOCUMENTS

| | | | | |
|---|---|---|---|---|
| 7,545,571 | B2* | 6/2009 | Garoutte | G02B 27/0172 345/7 |
| 8,836,768 | B1* | 9/2014 | Rafii | G06F 3/017 345/420 |
| 2001/0036361 | A1* | 11/2001 | Suda | G03B 13/32 396/111 |
| 2012/0249741 | A1* | 10/2012 | Maciocci | G06F 3/011 348/46 |
| 2013/0088941 | A1* | 4/2013 | Elian | B81B 7/0061 367/99 |
| 2013/0154913 | A1* | 6/2013 | Genc | G06F 3/012 345/156 |
| 2013/0156265 | A1* | 6/2013 | Hennessy | A61B 3/113 382/103 |
| 2013/0278631 | A1* | 10/2013 | Border | G02B 27/017 345/633 |
| 2015/0062160 | A1* | 3/2015 | Sakamoto | H04N 17/002 345/633 |
| 2015/0097719 | A1* | 4/2015 | Balachandreswaran | G01B 11/002 342/147 |
| 2016/0193104 | A1* | 7/2016 | Du | G02C 7/081 351/203 |
| 2017/0131764 | A1* | 5/2017 | Bognar | G06T 7/50 |

* cited by examiner

WEARABLE INTELLIGENT SYSTEMS AND INTERACTION METHODS THEREOF

CROSS-REFERENCES TO RELATED APPLICATIONS

This application claims the priority of Chinese patent application No. 201310741185.7, filed on Dec. 27, 2013, the entirety of which is incorporated herein by reference.

FIELD OF THE INVENTION

The present invention generally relates to the field of intelligent electronics and, more particularly, relates to wearable intelligent systems and interaction methods thereof.

BACKGROUND

Wearable intelligent devices are a type of portable devices that are able to be worn on the user's body, or integrated into cloth and/or accessories of end users. The wearable intelligent devices are not just a kind of hardware equipments; they are also able to achieve other powerful functions by using appropriate software support, data interactions and cloud platform interactions, etc. Thus, the wearable intelligent devices will be able to change daily lives and cognitions.

Wearable intelligent devices are considered as a next attractive field pushing the development of the electronic industry forward. By 2016, the total value of the global market of the wearable intelligent devices may be up to six billion dollars.

In order to advance themselves in the developments of the wearable intelligent devices, a plurality of companies have invested a large amount of funds in research and development; and numerous wearable intelligent devices have been launched. For example, Apple has launched the IWatch products; Nike has launched the NiKe[30] FuelBand SE products; Adidas will launch intelligent watches based on the Android system; Macrotellect has launched the BrainLink brain wave sensors; Sony has launched Smart watches; Baidu has launched the Codoon band products; Disney has launched the Magicband products; Snda has launched the GEAK intelligent watches; and Google has launched the Google glass products.

However, more or less, the above-mentioned devices have their own defects. Further, the main functions of the above-mentioned devices may be to calculate some parameters of running, navigating and/or photographing, or record movement data of users.

Sometimes, the parameters and/or the data may not be precise. The disclosed devices and methods are directed to solve one or more problems set forth above and other problems.

BRIEF SUMMARY OF THE DISCLOSURE

One aspect of the present disclosure includes a wearable intelligent system. The wearable intelligent system includes a frame; and a micro projector disposed on the frame configured to project an image interface onto a beam splitter. The wearable intelligent system also includes the beam splitter disposed on the frame configured to receive the image interface and form a virtual image in a user's eye; and a position sensor disposed on the front of the frame configured to sense a position of at least a part of the user's body and a change mode of the position with time and convert the change mode of the position into operation commands and the position into a position data. Further, the wearable intelligent system includes a central data hub disposed on the frame configured to at least receive the position data and the operation commands and adjust the image interface to match the part of the user's body and perform corresponding operations according to the position data.

Another aspect of the present disclosure includes an interaction method for using the wearable intelligent system. The method includes providing an object and a wearable intelligent device at least having a micro projector, a beam splitter, a position sensor and a central data hub having interaction modes. The method also includes obtaining the position and the motion of the object using the position sensor and sending the position and the motion to the central data hub. Further, the method includes analyzing the position and the motion according to the interaction mode by the central data hub; and converting results from the analysis into a corresponding image data. Further, the method also includes projecting an image onto a beam splitter by the micro projector according to the image data; and forming a virtual image in at least one of the user's eyes and stacking the virtual image with a corresponding position of the object.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

The existing wearable devices may only have some limited functions, such as voice-controlled photographing, video chatting, navigating, or web surfing, etc. Further, the interaction capability of the existing wearable devices may be poor. For example, some of the devices may need to be turned on by voice; and some of the devices may need to be operated by users using the embedded switches and/or buttons, etc. Such operations may need extra voice-control hardware and/or related hardware, it may increase the hardware cost and the device size, and it may cause an unacceptable interaction between the wearable devices and the users. According to the disclosed devices and methods, the interaction issues and other related issues may be overcome by a wearable intelligent system having the capability of using both virtual images and real information.

Figure 1:
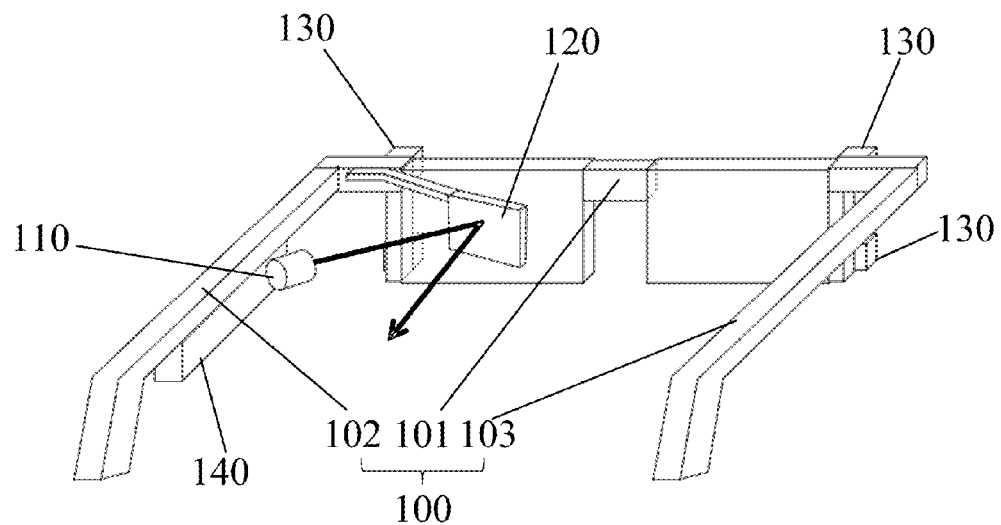
FIG. 1 illustrates a wearable intelligent system consistent with the disclosed embodiments.

FIG. 1 illustrates a wearable intelligent system consistent with the disclosed embodiments. As shown in FIG. 1, the wearable intelligent system may include a frame 100. The frame 100 may be any appropriate shapes and/or structures, such as an eyeglass, or a goggle, etc. In one embodiment, the frame 100 may be an eyeglass frame. The frame 100 provides a base for the wearable intelligent system, other components of the wearable intelligent devices may be disposed on the frame 100.

The wearable intelligent system also includes a micro projector 110 disposed on the frame 100; and a beam splitter 120 disposed on the frame 100. The micro projector 110 may be configured to project an image interface onto the beam splitter 120. Correspondingly, the beam splitter 120 may receive the image interface projected by the micro projector 110. Further, the beam splitter 120 may form a virtual image of the image interface in at least one of the eyes (retina) of the user. Thus, the micro projector 110 may be referred as a retina projector.

Further, as shown in FIG. 1, the wearable intelligent system may include a plurality of position sensors 130 disposed on the front of the frame 100. In certain other embodiments, the number of the position sensor 130 may be one. The positions sensors 130 may be configured to sense at least the position of a part of the user's body and the change mode of the position. Further, the positions sensors 130 may also convert the position and the change mode of the position to operation commands; and convert the position to the position data.

Further, as shown in FIG. 1, the wearable intelligent system may also include a central data hub 140 disposed on the frame 100. The position sensors 130 may electrically connect with the central data hub 140. The central data hub 140 may be configured to receive the operation commands and the position data from the position sensors 130; and adjust the position of the image interface to match at least of the position of part of the user's body; and perform certain operations.

Referring to FIG. 1, in one embodiment, the eyeglass shape frame 100 may include a lateral extending first frame 101 and a first arm 102 and a second arm 103 extending from the two ends of the first frame 101. When the wearable intelligent system is worn by a user, the first frame 101 may be approximately parallel to the face of the user. Further, the first frame 101 may provide a support for the beam splitter 120 and the position sensors 130. Such a support may aid the beam splitter 120 to form an optimized virtual image in the user's eyes. Further, the position sensors 130 may be disposed on an optimized peripheral position of the frame 100. Such a position may aid the position sensors 130 to sense an as large as possible viewing range of the body position and the motion of the user.

Further, as shown in FIG. 1, the first side arm 102 and/or the second side arm 103 may also provide a support for the micro projector 110 and the central data hub 140. In one embodiment, the micro projector 110 and the central data hub 140 are disposed on a same side arm, for example, the first side arm 102. In certain other embodiments, the micro projector 110 and the central data hub 140 may be disposed on the second side arm 103. In certain other embodiments, the micro projector 110 and the central data hub 140 may be disposed on different side arms. According to the principle of the wearable intelligent system, the position of the micro projector 110 may need to match the beam splitter 120 so that the image interface may be projected onto the beam splitter 120.

In one embodiment, appropriate lenses may be disposed on the first frame 101. The lenses may be normal glass lens.

Further, the wearable intelligent system may also include a communication module (not shown). The communication module may be disposed at any appropriate position of the frame 100. For example, the communication module may be embedded in the frame 100, or may be included in the central data hub 140. The communication module may be configured to intercommunicate with a cell phone, a telephone, a computer, or a tablet, etc. by Wi-Fi, blue-tooth, GPRS, WAP, HSCSD, EDGE, EPOC, WCDMA, CDMA2000, or TD-SCDMA, etc.

Further, the wearable intelligent system may also include a local database (not shown). The central data hub 140 may call the local database for a data support.

Figure 2:
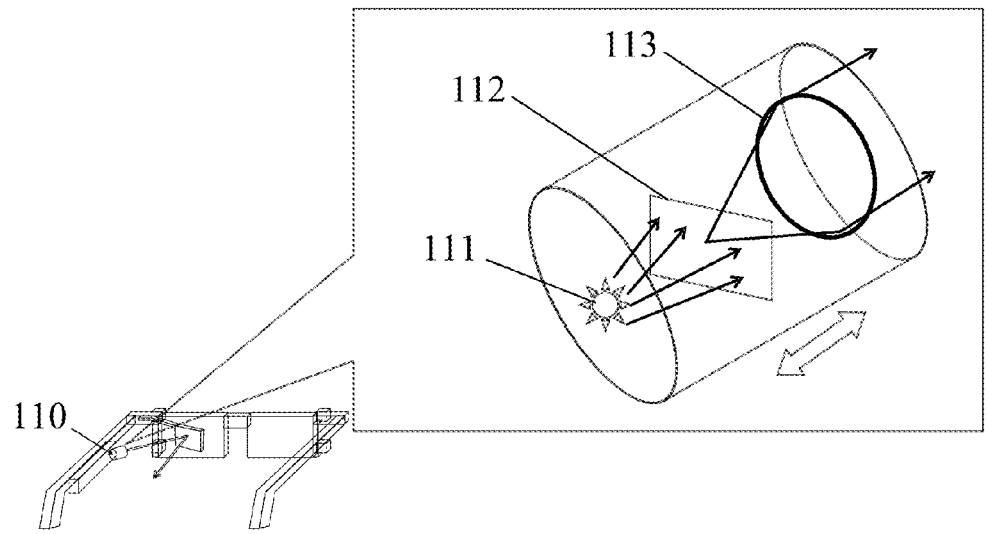
FIG. 2 illustrates a micro projector of the wearable intelligent system consistent with the disclosed embodiments.

FIG. 2 illustrates an amplified micro projector 110 of the wearable intelligent system consistent with the disclosed embodiments. As shown in FIG. 2, the micro projector 110 may include a micro light source 111. The micro light source 111 may provide light for the micro projector 110. Various light sources may be used as the micro light source 111. In one embodiment, the micro light source 111 may be a light-emitting diode (LED) light source.

The micro projector 110 may also include an image filter 112. The image filter 112 may be configured to receive light emitting from the micro light source 111; and project images on a micro projection lens according to inquiries. The image filter 112 may be semi-transparent to let the light from the micro light source 111 to pass through and output the images according to the inquiries. The image filter 112 may be any appropriate type of devices. In one embodiment, the image filter 112 is a liquid crystal display (LCD).

Further, as shown in FIG. 2, the micro projector 110 may also include a micro projection lens 113. The micro projection lens 113 may be able to move along the optical axis of the micro projector 110; and output the images according to the change of the focus length. The micro projection lens 113 may be a single lens, or a lens system having a plurality of lenses. In one embodiment, the micro projection lens is a lens system having a plurality of the lenses.

Further, the micro projector 110 may also include input/output modules (not shown). The input/output modules may receive the data and command from the central data hub 140; and output the corresponding image and operation commands as images.

Further, the micro projector 110 may be configured to have an adjustable projection angle. The angle of the output images may be controlled by adjusting the projection angle of the micro projector 110.

Referring to FIG. 1 and FIG. 2, the wearable intelligent system may work at any appropriate modes by setting up the micro projector 110 and the beam splitter 120 and adjusting the intensity of light entering into the user's eyes, such as a stacking mode, or a total virtual mode, etc. The stacking mode may refer to stack the virtual images of the image interface formed in the user's eyes of and the real observed images. The total virtual mode may refer that the eyes of the user may only receive the virtual images of the image interface formed on the eye of the user.

Referring to FIG. 1, the beam splitter 120 may connect with the frame 100 by a splitter frame (not labeled). The splitter frame may be adjustable in a certain range of angles. Such an adjustment may aid the beam splitter 120 to receive the image projected from the micro projector 110; and form virtual images in the user's eyes.

The beam splitter 120 may be any appropriate type of devices and structures. In one embodiment, the beam splitter 120 is a reflective mirror. The reflectivity of the reflective mirror may be in a range of approximately 30%~70%. In one embodiment, the reflectivity is 50%.

In certain other embodiments, the beam splitter 120 is a semi-transparent planar mirror. The beam splitter 120 with such a planar mirror may be configured to reflect the images output from the micro projector 110, and form the virtual images in the user's eyes. Further, the semi-transparent beam splitter 120 may allow the user to receive the direct light from front, thus the user may be able to receive the virtual images and the real images simultaneously.

Referring to FIG. 1, in one embodiment, the image interface output from the micro projector 110 may project the image to the infinity, or up to some dioptric adjustment of the viewing eye, the image is bent by the beam splitter 120, thus the image interface may form virtual images in the user's eye.

Referring to FIG. 1, the position sensors 130 may be disposed at the front of the frame 130. The position sensors 130 may be any appropriate devices, such as a wave reflective device, or an imaging sensor, etc. Using the principle of the acoustics and or optics, the position sensors 130 may obtain the positions and motions of one hand, one finger, one fist, one arm, two hands, or multiple fingers, etc.; and then match and/or link such positions and motions with certain commands, such as select, confirm, move, or unlock, etc.

The position sensors 130 may be configured to sense the change modes of the position of a body part with time. For example, change modes of the position with time may include a single click, a double-click or slide of a finger; moving and tapping of fist; a lateral movement, a vertical movement, a movement away from the face of user or a movement close to the face of the user, etc.

For example, a single click of a finger may match and/or link as a select command; a double-click of a finger may match and/or link as a confirm command; and a slide of a finger may match and/or link as an unlock command. In certain other embodiments, the position, the movement, the commands may be set up by the user with other appropriate ways.

Referring to FIG. 1, the central data hub 140 may be any appropriate devices, such as processors, or controllers, etc. For example, the central date hub 140 may be a central processing unit (CPU), or a CPU integrated with a video processor, etc. The central data hub 140 may be able to at least receive the position data and the operation commands; and control the micro projector 110 to output the corresponding image interface according to the position data and the operation commands to match at least the position of a part of the user's body; and process operations corresponding to the operation commands.

The central data hub 140 may also be configured to exchange data with a remote database. The central data hub 140 may obtain data support from the remote database by Wi-Fi, blue-tooth, GPRS, WAP, HSCSD, EDGE, EPOC, WCDMA, CDMA2000, or TD-SCDMA, etc.

Further, the central date hub 140 may have an embedded battery (not shown). The embedded battery may provide power to the central data hub 140. The battery may be any appropriate type of batteries, such as a lithium-ion battery, a solar cell, or a supper capacitor, or a combination of these types, etc.

Thus, by setting up the micro projector 110 and the beam splitter 120, virtual images may be formed in the user's eye. Further, the position of at least a part of the user's body and the change mode of the position with time may be obtained by the position sensors 130; and the central data hub 140 may adjust the position of the virtual images according to the data obtained by the position sensors 130. Thus, the virtual images may match the real image of the body in the user's eye; and the motion of the user may reconcile with the virtual effect.

Figure 3:
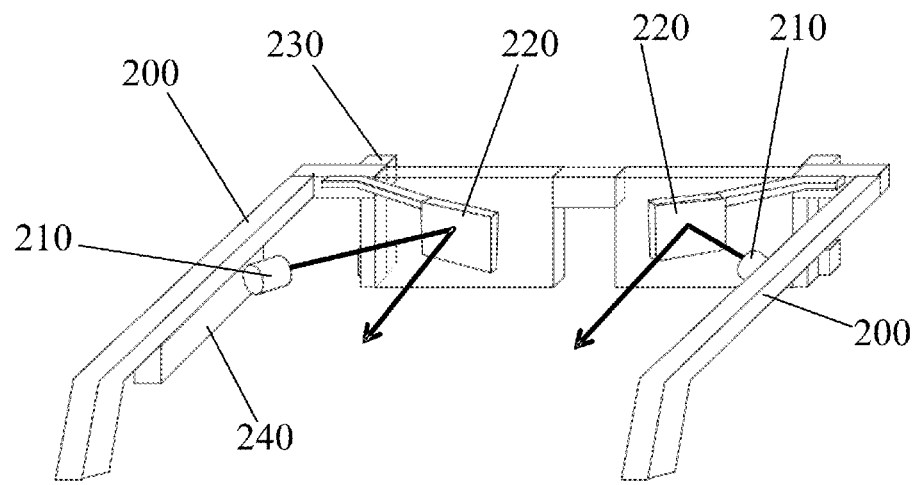
FIG. 3 illustrates another wearable intelligent system consistent with the disclosed embodiments.

FIG. 3 illustrates another wearable intelligent system consistent with the disclosed embodiments. As shown in FIG. 3, the wearable intelligent system may include a frame 200 and two micro projectors 210 disposed at both sides of the frame 200, respectively. The wearable intelligent device may also include two beam splitters 220 disposed on the frame 200, respectively The micro projectors 210 may be configured to project an image interface onto the beam splitters 220. The beam splitters 220 may be configured to receive the image interface and form a virtual image in the user's eyes.

Further, the wearable intelligent system may also include a plurality of position sensors 230 disposed on the front of the frame 230. The position sensors 230 may be configured to sense the position of at least one part of the user's body and the change mode of the position with time; and covert the change mode of the position with time into corresponding operation commands and the position into a position data.

Further, the wearable intelligent system may also include a central data hub 240 disposed on the frame 200. The central data hub 240 may be configured to at least receive the position data and the operation commands; and adjust the image interface to match at least the position of the user's body and perform corresponding operations according to the position data.

Referring to FIG. 3, the wearable intelligent system may include two micro projectors 210 and two beam splitters 220. The two micro projectors 210 may be disposed on the first arm (not labeled) and the second arm (not labeled), respectively. Therefore, the virtual image may be formed in the left eye and the right eye of the user; and the image may appear to be three-dimensional.

Figure 4:
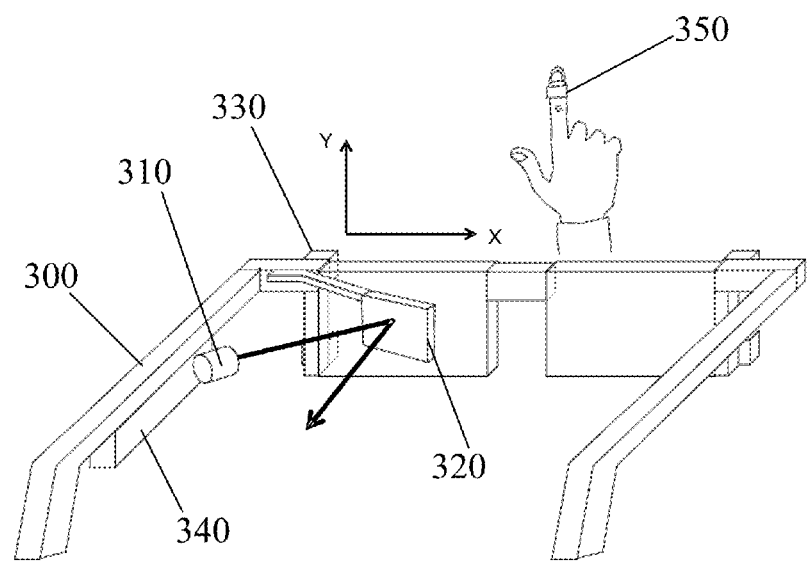
FIG. 4 illustrates another wearable intelligent system consistent with the disclosed embodiments.

FIG. 4 illustrates another wearable intelligent system consistent with the disclosed embodiments. As shown in FIG. 4, the wearable intelligent system may include a frame 300. The wearable intelligent system may also include a micro projector 310 disposed on the frame 300 and a beam splitter 320 disposed on the frame 300.

The micro projector 310 may be configured to project an image interface onto the beam splitter 320. The beam splitter 320 may be configured to receive the image interface projected from the micro projector 310; and form a virtual image in the user's eye.

Further, the wearable intelligent system may also include a position recognizer 330 disposed on the frame 300. The position recognizer 330 may be configured to sense the position of a part of the user's body and the change mode of the position with time; and covert the change mode of the position with time into operation commands and the position into a position data. The position recognizer 330 may function as the position sensors described above.

The position recognizer 330 may be any appropriate devices. In one embodiment, the position recognizer 330 is a sonic based device that is able to emit and receive a sound wave, and detect the position of a part of the user's body through a target having different sound impedances. The target may be referred as a wave reflector worn on the user's body, such as a ring, etc.

Further, the wearable intelligent system may also include a central data hub 340. The central data hub 340 may be configured to receive the position data and the operation commands; and adjust the image interface to match the position of the user's body and perform corresponding operations according to the position data.

Further, the wearable intelligent system may also include a wave reflector 350 worn on one finger of the user. The wave reflector 350 may be configured to pair with the position recognizer 340 to confirm the position of the finger and the change mode of the position with time.

The wave reflector 350 may be any appropriate devices or structures. In one embodiment, the wave reflector 350 is a metal loop, such as a ring, etc. The wave reflector 350 may also be an active device that is able to emit signals to the position recognizer Referring to FIG. 4, the position recognizer 330 may emit a sound wave to a certain predetermined area, when the wave reflector 350 (the metal ring) enters into the area, the sound wave may be reflected by the wave reflector 350; and the position recognizer 330 may receive the position data and the operation commands; and then send the position data and the operation commands to the central data hub 340. The central data hub 340 may calibrate the micro projector 310 and/or the beam splitter 320 according to the position data and the operation commands to stack the virtual image of the image interface with the position of the real image of the finger in the user's eye; and then the central data hub 340 may perform corresponding operations according to the operation commands.

In one embodiment, the distance between the wave reflector (the metal ring) 350 and the position recognizer 330 may be determined by the following equation:

$$d = \frac{V_0 t}{2}$$

where d refers to the distance between the wave reflector 350 and the position recognizer 330; $V_0$ refers to the velocity of sound wave in air.

In one embodiment, when the wave is a supersonic, $$V_0 = 331.45 \times \left(1 + \frac{\tau}{273.15}\right)^{\frac{1}{2}} \text{ m/s}$$

where τ refers to the temperature of the environment where the sound wave travels.

The change mode of the position of the wave reflector 350 (the metal ring) with time relative to the position recognizer 330 may be determined by the Doppler effect as following:

$$\Delta f = \left(2 \times V \times \frac{\cos\theta}{V_0}\right) \times f$$

where Δf refers the frequency shift detected by the position recognizer 330; V refers to the relative velocity of the wave reflector 350 to the position recognizer 330; f refers the velocity of the sound wave; and θ refers to an angle between the moving the direction of the wave reflector 350 and a connecting line of three positions. The three positions may include the position of the wave reflector 350 (the metal ring), the position of the wave emitted by the position recognizer 330 and the detector (not shown) of the position recognizer 330. The metal ring may be a gold ring, a silver ring, or a platinum ring, etc.

Referring to FIG. 4, a plurality of the position recognizers 330 may be disposed on the wearable intelligent system, such as one, two, three, four . . . six . . . eleven etc. In one embodiment, four position recognizers 330 are disposed on the wearable intelligent system. The four position recognizers 330 may be disposed on the upper-left corner, the down-left corner, the upper-right corner and the down-right corner of the frame 300. Such a configuration may aid to obtain a significantly large sensing area. Further, more numbers of position recognizers 330 may aid to determine and confirm the position of the wave reflector in the 3-dimensional space and the operation commands of the wave reflector 350 more precisely.

Further, rings worn on a finger may be used as the wave reflector 350, the user may not need wear extra devices to achieve such a function; and it may also enhance the ability to confirm the position of the finger.

Figure 5:
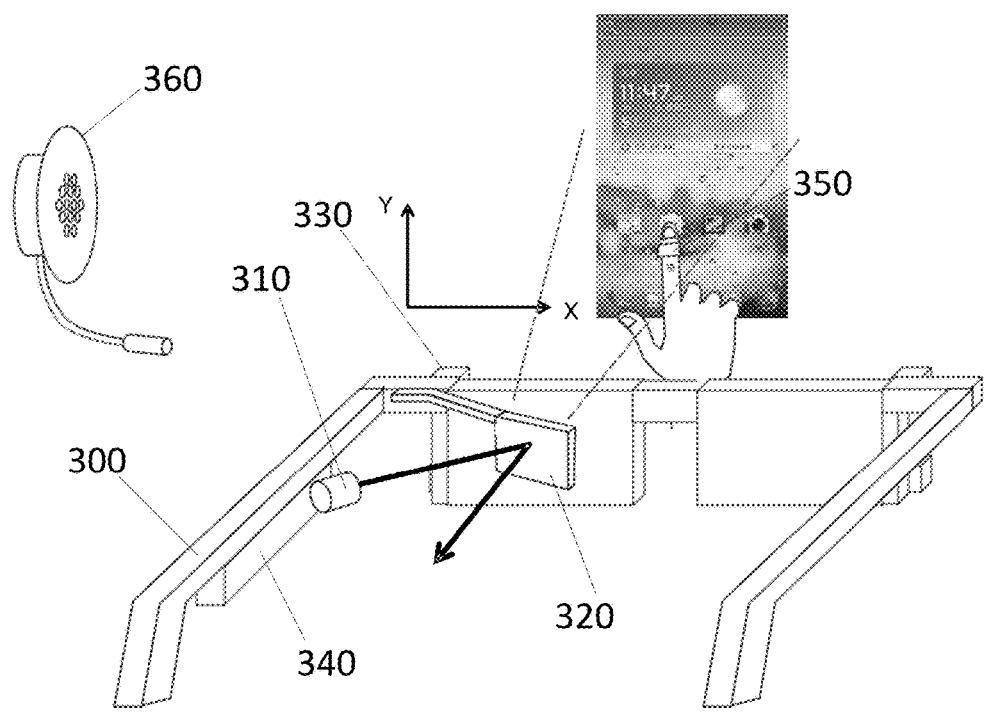
FIG. 5 illustrates an exemplary process for a wearable intelligent system to adjust the image interface to match the position of at least a part of the user's body consistent with the disclosed embodiments.

FIG. 5 illustrates a process for the wearable intelligent system to adjust the image interface to match the position of at least one part of the user's body and perform corresponding operations consistent with the disclosed embodiments.

For illustrative purposes, the position recognizer 330 with the wave emitting and receiving functions and the wave reflector 350 illustrated in FIG. 4 are used for the description. The moving direction, the moving distance and the moving velocity of the wave reflector 350 (the metal ring) worn on the finger may be obtained by the position recognizer 330 according to the relative position of the position recognizer 330 and the wave reflector 350.

The central data hub 340 may be embedded with the pre-saved data of the user.

After receiving the distance data between the position recognizer 330 and the wave reflector 350, the central data hub 340 may calculate an adjustment data of the image interface according to the distance data. Then, the central data hub 140 may determine which location on the virtual image interface formed in the user's eye according the to the adjustment data coincides with user's pointing position, so as that the location on the virtual image may match the position of the finger of the user.

In certain other embodiments, the central data hub 340 may be embedded with the pre-saved data of the user. After receiving the distance between the position recognizer 330 and the wave reflector 350, the central data hub 340 may calculate an adjustment data of the image interface according to the distance data. Then, the central data hub 140 may calibrate the position recognizer 330 to adjust the virtual image of the image interface formed in the eye of the user according to the adjustment data, so as that the virtual image may match the position of the finger of the user.

For example, the micro projector 310 may send a target pattern, such as a cross-star pattern; and a virtual image of the target pattern may be formed in the user's eye. Then, the user may click the cross-star pattern using the finger wearing the metal ring (the wave reflector 350). The current position of the finger wearing the metal ring may be recognized by the position recognizers 330 (position sensors); and the position of the target pattern of the micro projector 310 may be calibrated with the current position of the finger wearing the metal ring.

A two-dimensional coordinate may be used to describe the process. For example, the coordinate of the target pattern is (0, 0). The coordinate of the current position of the finger on the position recognizers 330 is (5, 7). The central data hub 340 may adjust the coordinate of the current position of the finger (5, 7) as (0, 0) according to the coordinate of the current position of the finger (5, 7) output by the position recognizers 330.

Further, the central data hub 340 may determine the action of the user, such as a single click, a double click, or a slide, etc., according to the pre-saved data and the moving direction, the moving distance and the moving velocity of the metal ring obtained by the position recognizers 330. Further, a corresponding operation, such as select, confirm or unlock, etc., may be performed according to the pre-saved data embedded in the central data hub 340.

Referring to FIG. 5, in one embodiment, the wearable intelligent system may also include a compatible voice transfer unit 360, i.e., a sound input and out device. The voice transfer unit 360 may send the position data and the operation commands to the central data hub 340 according to the voice command of the user. The central data hub 340 may adjust the output image interface and perform the operation commands according to the voice commands. The voice transfer unit 360 may be an earphone and a speaker, etc.

Figure 6:
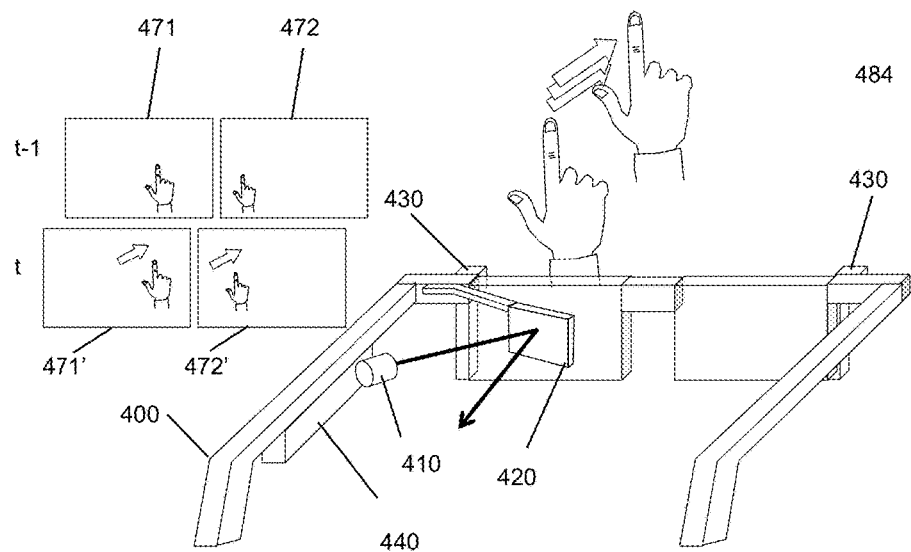
FIG. 6 illustrates another wearable intelligent system consistent with the disclosed embodiments.

FIG. 6 illustrates another wearable intelligent system consistent with the disclosed embodiments. As shown in FIG. 6, the wearable intelligent system may include a frame 400. The wearable intelligent device may also include a micro projector 410 disposed on the frame 400 and a beam splitter 420 disposed on the frame 400.

The micro projector 410 may be configured to project an image interface onto the beam splitter 420. The beam splitter 420 may be configured to receive the image interface and form a virtual image of the image interface in the user's eye.

Further, the wearable intelligent system may also include a position sensor 430. The position sensor 430 may be configured to sense the position of at least one part of the user's body and the change mode of the position with time; and convert the change mode of the position with time into operation commands and the position into a position data.

The position sensor 430 may be any appropriate devices. In one embodiment, the position sensor includes a plurality of imaging sensors (not shown) disposed at different positions. The position and the number of the imaging sensors may be chosen according to the specific requirements of the wearable intelligent system, as long as the position and the number of the imaging sensors may enable the position sensor 430 to be able to sense the position of at least a part of the user's body and the motion of the part of the body; and convert the motion of the part of the body into operation commands and the position into a position data.

Further, the wearable intelligent system may also include a central data hub 440 disposed on the frame 400. The central data hub 440 may be configured to at least receive the position data and the operation commands. The central data hub 440 may also be configured to adjust the image interface to match at least the position of the user's body and perform corresponding operations according to the position data.

Referring to FIG. 6, in one embodiment, the position sensor 430 may include an image sensor disposed on the upper-left corner of the frame 400 and the upper-right corner of the frame 400.

The upper-left image sensor and the upper-right sensor may be controlled by synchronous sampling pulses to perform a parallel imaging data collecting with a significantly high speed. The sampling time may be used as an accessory information to be linked with the corresponding image frames. After the parallel imaging data collecting, the processor integrated in the position sensor 430 may obtain the image coordinate and the time information of at least a part of the user's body. Then, by using the image coordinate and the time information of the part of the user's body obtained by the upper-left image sensor and the upper-right image sensor, the processor integrated in the position sensor 430 may perform a matching process to synchronize the image coordinate of the part of the user's body into a global coordinate.

Various methods may be used to synchronize the image coordinate of the part of the user's body into a global coordinate, such as using a frame difference method, or a combination of check box and statistic method, etc., to sense the change mode of the position of at least one part of the user's body with time.

In one embodiment, the frame difference method may refer to obtaining the moving area of at least a part of the user's body with time by performing a frame subtraction between adjacent frames. The frame difference method may include a twice-frame-difference method, or a triple-frame-difference method, etc. In one embodiment, a twice-frame-difference method is used for illustration.

Referring to FIG. 6, the first image 471 and second image 472 may refer to the image data of at least a part of the user's body in an image plane at the time "t-1"; and the third image 471' and the fourth image 472' may refer to the image data of at least a part of the user's body in the image plane at the time "t". The position of the part of the user's body at the time "t-1" may be referred as "A"; and the position of the part of the user's body at the time "t" may be referred as "B". Thus, the twice-frame-difference method may use |A−B| to obtain the position data of at least the part of the user's body in the image plane.

Figure 7:
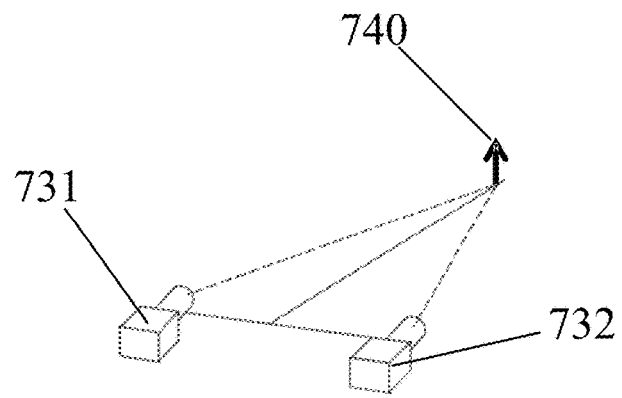
FIGS. 7~8 illustrate an exemplary process for a wearable intelligent system to obtain the position information and convert the position information to the position data consistent with the disclosed embodiments.
Figure 8:
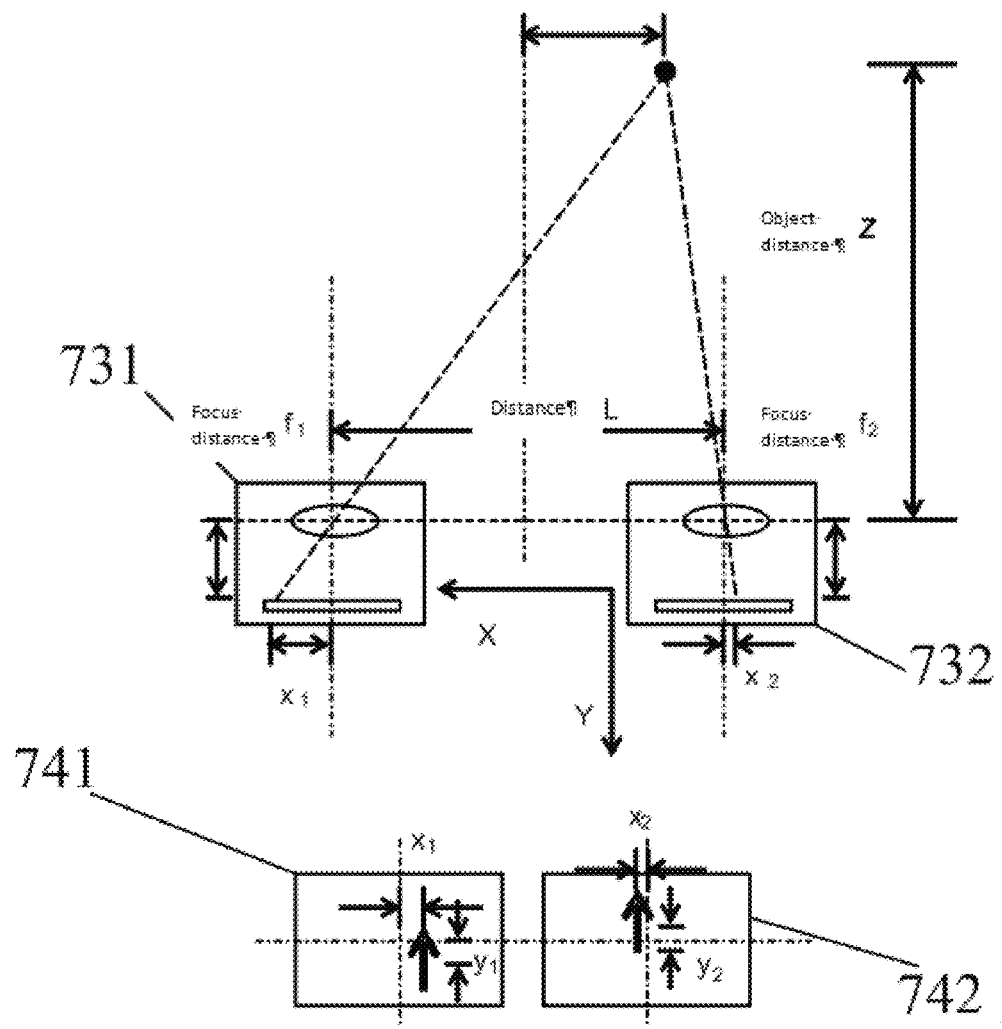

FIGS. 7~8 illustrate a process for the wearable intelligent device to obtain at least a part of the user's body consistent with the disclosed embodiments. For illustrative purposes, the upper-left image sensor 731 and the upper right image sensor 732 are illustrated; and an arrow 740 is used to illustrate the part of the user's body.

As shown in FIG. 8, the distance between the upper-left image sensor 731 and the up-right image sensor 732 may be referred as "L", and the distance "L" may be a preset value. The focus distance of the upper-left image sensor 731 may be referred as "$f_1$". The focus distance of the upper-right image sensor 732 may be referred as "$f_2$". The focus distance "$f_1$" of the upper-left image sensor 731 and the focus distance "$f_2$" of the upper-right image sensor 732 may be obtained from the displacement of an auto-focus apparatus.

When the part of the user's body is at a certain position, the global coordinate of the part of the user's body may be referred as (X, Y, Z). An image data 741 of the part of the user's body may be obtained by the upper-left image sensor 741; and another image data 742 of the part of the user's body may be obtained by the upper-right image sensor 742. By calculating the image data 741 and the image data 742, the position data of the part of the user's body may be obtained; and the image coordinate ($x_1, y_1$), and ($x_2, y_2$) may be obtained. In one embodiment, the image coordinate ($x_1, y_1$) may be obtained from the upper-left image sensor 731; and the image coordinate ($x_2, y_2$) may be obtained from the upper-right image sensor 732.

Thus, the global coordinate (X, Y, Z) of at least one part of the user's body may be obtained. Wherein:

$$Z = \frac{L}{\frac{x_1}{f_1} - \frac{x_2}{f_2}};$$

$$X = \frac{L}{2} \frac{\frac{x_1}{f_1} + \frac{x_2}{f_2}}{\frac{x_1}{f_1} - \frac{x_2}{f_2}}, Y = \frac{Z}{2}\left(\frac{y_1}{f_1} + \frac{y_2}{f_2}\right);$$

According to the above equations, the global coordinate (X, Y, Z) may be obtained. Further, according to the preset data, the change mode of the position with time may be obtained. For example, an one time finger movement along the Z direction in 3 seconds may be referred as a single click; a two time finger movement along the Z direction in 3 seconds may be referred as a double click; and the finger movement along the X direction in 2 seconds may be referred as a drag, etc.

In one embodiment, the part of the user's body may be simplified as a dot element. That is, the global coordinate (X, Y, Z) of the part of the user's body is the global coordinate of the gravity center of the body. In certain other embodiments, the part of the user's body may be determined by the difference between the skin brightness of the body and the environments combining with an erosion-thinning algorithm, a shape-center algorism, and/or a projective algorithm. Further, the change mode of the position with time may be pre-calibrated; and/or calibrated by embedded software to match the habits of the user.

In certain other embodiments, the position of the part of the user's body and the change mode of the position with time may be confirmed by any other appropriate methods. For example, a sport capturing mode of the image sensor may be used to confirm the position and the change mode. The image sensor may include CCD camera, or CMOS image sensor (CIS), etc.

Figure 9:
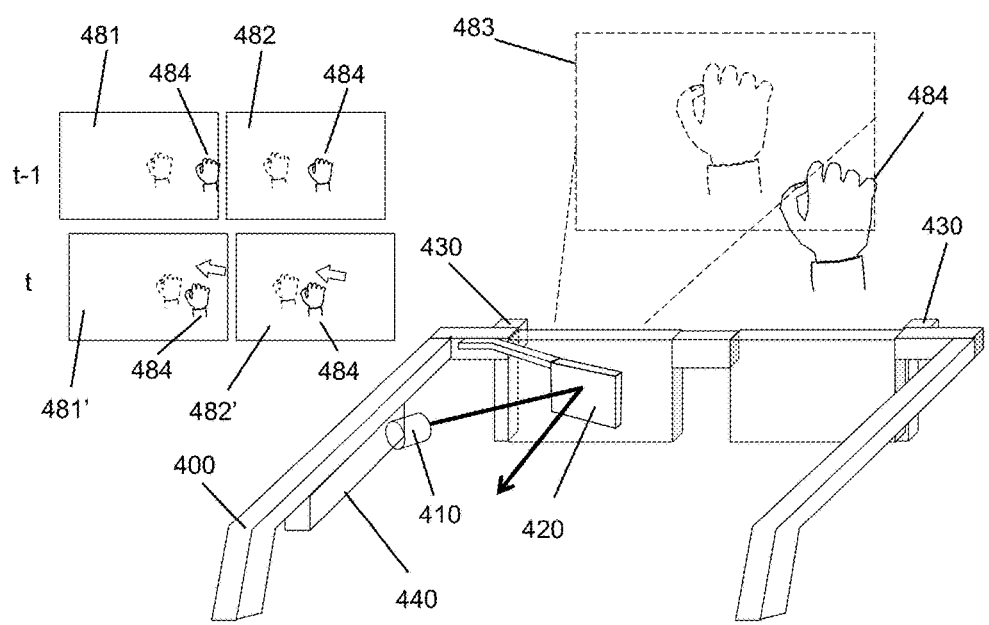
FIG. 9 illustrates an exemplary process for a wearable intelligent system to convert the position-time relationship to corresponding operation commands and convert the position information to the position data after obtaining the position of a part of the user's body and the position-time relationship consistent with the disclosed embodiments.

Further, referring to FIG. 9, after the image sensors 430 obtain the position of at least a part of the user's body and the change mode of the position with time, the change mode of the position may be converted into corresponding operation commands; and the position may be converted into a position data. In one embodiment, the part of the user's body is a fist. Further, a pre-saved data may be embedded in the central data hub 440. After the central data hub 440 receives the operation commands and the position data, an adjustment data may be calculated according to the position data and the pre-saved data. Then, the micro projector 410 and the bean splitter 420 may be controlled to adjust the virtual image of the image interface formed in the user's eye, so as that the virtual image may match the position of the part of the user's body.

Further, referring to FIG. 9, after the image sensors 430 obtain the position of at least a part of the user's body and the change mode of the position with time, the change mode of the position may be converted into corresponding operation commands; and the position may be converted into position data. Further, the pre-saved data may be embedded in the central data hub 440. After the central data hub 440 receives the operation commands and the position data, an adjustment data may be calculated according to the position data and the pre-saved data. Then, the position of the image sensor may be calibrated to adjust the virtual image of the image interface formed in the user's eye, so as that the virtual image may match the position of the part of the user's body.

For example, the micro projector 410 may sent a target pattern, such as a cross-star, etc.; and a virtual image of the cross-star may be formed in the user's eye. Then, the user may click the cross-star; and the image sensor 430 may sense the current position of the finger; and calibrate the current position of the finger with the position of the target pattern of the micro projector 410. For illustrative purposes, a two-dimensional coordinate system may be used. The coordinate of the target pattern may be referred as (0, 0), the coordinate of the current position of the finger obtained by the image sensor 430 may be referred as (5, 7). The central data hub 440 may calibrate the coordinate (5, 7) of the current position of the finger as the coordinate (0, 0) of the target pattern according to the coordinate (5, 7) of the current position of the finger transferred by the image sensor 430.

At the same time, the action of the finger, such as single click, a double click, a move, or unlock, etc., may be confirmed according to the pre-saved data embedded in the central data hub 440 and the moving direction, the moving distance and the moving velocity of the part of the user's body obtained by the image sensor 430. Further, operations, such as select, confirm, move, or unlock, etc., may be performed according to the pre-saved data of the user embedded in the central data hub 440.

In certain other embodiments, referring to FIG. 9, the change mode of the fist 484 may be obtained by the position sensors 430 (image sensors). The position of the fist 484 at time "t-1" may be referred as a fifth image 481 and a sixth image 482 from both left and right 430 position sensors, respectively, and time "t" may be referred as a seventh image 481' and a eighth image 482'. According to above-described equations for a twice-frame-difference method, the position of the fist 484 and the moving path of the fist 484 may be converted into operation commands and a position data. After the central data hub 440 receives the operation commands and the position data, the micro projector 410 and the beam splitter 420 may be controlled to adjust the output image interface; and form a virtual image 483 of the fist 484 in the user's eye. Thus, the user may have a better experience when the user operates the image interface.

Figure 10:
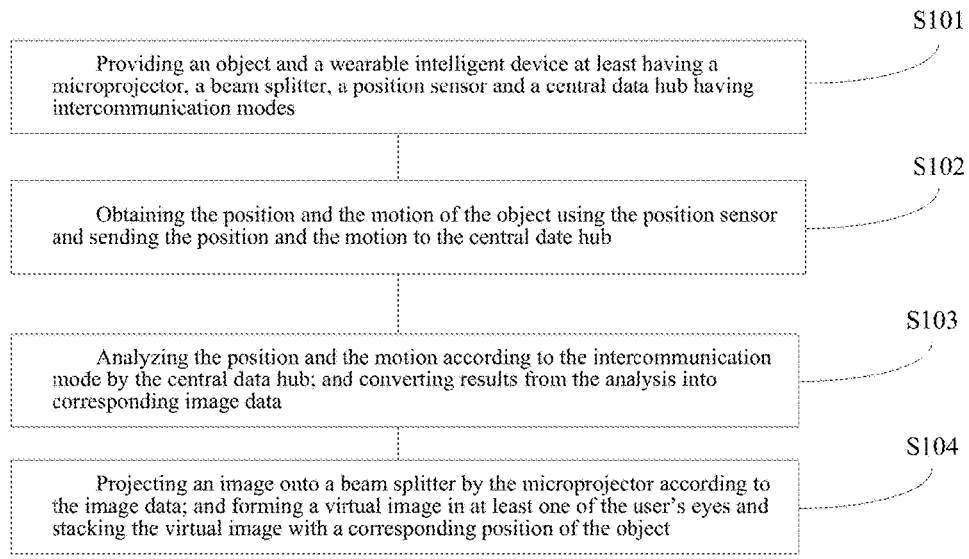
FIG. 10 illustrates an exemplary interaction method for using a wearable intelligent system consistent with the disclosed embodiments.

Thus, an interaction method for using the wearable intelligent system may be provided according to the disclosed devices and structures; and FIG. 10 illustrates the interaction method.

As shown in FIG. 10, the interaction method may include providing an object and a wearable intelligent system at least having a micro projector, a beam splitter, a position sensor and a central data hub (S101).

The central data hub may have an interaction mode. The interaction mode may include a wrestling mode, a chess book mode, a dancing mode, a card playing mode, or a gaming mode, tec.

The object may be a teammate or an opponent of a game, a chess book or chess pieces, an attacker, or a table and cards, etc.

The interaction method may also include obtaining the position and the motion of the object using the position sensor and sending the position and the motion to the central date hub (S102).

Further, the interaction method may include analyzing the position and the motion according to the interaction mode by the central data hub; and converting results from the analysis into a corresponding image data (S103).

Further, the interaction method may also include projecting an image onto a beam splitter by the micro projector according to the image data; and forming a virtual image in at least one of the user's eyes and stacking the virtual image with a corresponding position of the object (S104).

The virtual image may in situ remind the user, thus the amusement and the skills of user may be increased. For example, it may give hiding hints to the user during a game, or show the weakness of the opponent during a wrestling. Thus, the interaction technique of the user may be improved.

Figure 11:
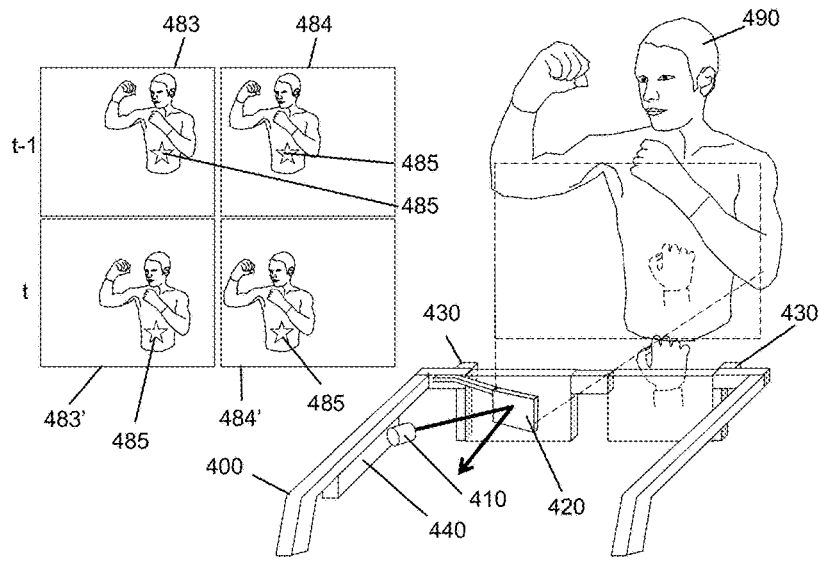
FIG. 11 illustrates another exemplary interaction method for using the wearable intelligent system consistent with the disclosed embodiments.

FIG. 11 illustrates another interaction method of the wearable intelligent system consistent with the disclosed embodiments; and a wrestling mode may be used for an illustration.

As shown in FIG. 11, the object 490 is an attacker. The position sensors 430 may obtain the ninth image 483 and the tenth image 484 at the time "t-1" and the eleventh image 483' and the twelfth image 484' at the time "t", respectively. In certain other embodiments, more image information may be obtained by the image sensors 430, such as a thirteenth image, an fourteenth image . . . a twentieth image, etc, according to certain requirements. The images sensors 430 may obtain the position and the motion of the attacker 490 according to the image information. Further, the weakness 485 of the attacker may be obtained by the central data hub 440 by analyzing the position and the motion of the attacker 490 according to the wrestling mode. The weakness 485 of the attacker 490 may be converted into a corresponding image data. Then, the micro projector 410 of the wearable intelligent system may project a corresponding image onto the beam splitter 420 according to the image data. The beam splitter 420 may form a virtual image of the image in the user's eye; and the virtual image and the weakness of the attacker may be stacked.

The wresting mode embedded in the central data hub 440 may include comprehensive wresting skills, twisting skills (spiting, capturing, locking, fastening, wrenching, pointing, twisting, cutting, screwing, bruising, revolving, scrolling, sealing, or closing, etc), kickboxing skills, judo skills, jeet kune do skills, wing chun skills, or martial art skills, etc. The wresting mode may be able to analyze the position and action of the attacker, and obtain the position of the weakness of the attacker. The central data hub 440 may control the micro projector 410 and the beam splitter 420 to form a virtual image of a corresponding image of the position of the weakness in the user's eye. The corresponding image may be an image of a fist or other appropriate images. That is, the virtual image may be corresponding to the position of the weakness on the user's body. Thus, the user may attack the position of the weakness according to the virtual image; and the defensive skill of the user may be improved to a certain extend.

A chess book mode may also be used to illustrate another interaction method of the wearable intelligent device.

For example, the interaction mode is a chess book mode. The object may be the chess board and the chess pieces. The central data hub may analyze the chess board and the position and the change of the chess pieces on the chess board according to the chess book mode; and obtain a direction of playing chess. The direction of playing chess may be converted into a corresponding image data. The micro projector of the wearable intelligent system may project a corresponding image onto the beam splitter according to the image data. Then, the beam splitter may form a corresponding virtual image in the user's eye; and the virtual image may be stacked with the position on the chess board.

The interaction method of the disclosed wearable intelligent system may be able to give a hint to the user with a concealed and portable way, thus the user may obtain the intercommunicate skills without disturbing others.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:

1. A wearable intelligent system, comprising:
   a frame;
   a micro projector disposed on the frame configured to directly project an image interface onto a beam splitter, wherein an optical axis of the micro projector points to the beam splitter;
   the beam splitter disposed on the frame configured to receive the image interface and to form a virtual image in a user's eye;
   a position sensor disposed on the front of the frame configured to sense a position of at least a part of the user's body and a change mode of the position with time and convert the change mode of the position into operation commands and the position into a position data; and
   a central data hub disposed on the frame configured to at least receive the position data and the operation commands and adjust the image interface to match the part of the user's body and perform corresponding operations according to the position data, wherein
   a target pattern projected by the micro projector is calibrated according to the position of the at least the part of the user's body sensed by the position sensor,
   the image interface is adjusted by controlling the micro projector and the beam splitter to match the position of at least the part of the user's body.

2. The wearable intelligent system according to claim 1, further including;
   a wave reflector disposed on a finger of the user to reflect a wave signal emitted from the position sensor, and the reflected wave signal is able to be sensed by the position sensor to confirm a position and action of the finger.

3. The wearable intelligent system according to claim 2, wherein:
   the wave reflector is a metal ring; and
   the position sensor is a sonic based device that is able to emit and receive a sound wave signal; and
   the sound wave signal is a supersonic signal.

4. The wearable intelligent system according to claim 1, wherein:
a plurality of micro projectors are disposed on the frame;
a plurality of beam splitters are disposed on the frame; and
a plurality of the position sensors are disposed on the frame.

5. The wearable intelligent system according to claim 1, wherein:
the frame is an eyeglass; and
the eyeglass has two lenses.

6. The wearable intelligent system according to claim 1, wherein the micro projector further includes:
a micro light source configured to provide a light to the micro projector;
an image filter configured to receive the light output from the micro light source and output an image onto a micro projection lens; and
the micro projection lens configured to move along the optical axis of the micro projector to cause the focus of the output image to change in order to fit for the diopter variation of the user eye.

7. The wearable intelligent system according to claim 1, wherein:
the part of the user's body includes a finger, a hand, a fist, an arm, or multiple hands, multiple fingers.

8. The wearable intelligent system according to claim 1, further including:
a sound input and output device;
a local database; and
a remote database.

9. The wearable intelligent system according to claim 1, further including:
a communication module configured to connect the wearable intelligent system to a variety of the intelligent devices including one or more of computers, cellphones, and tablets by a wireless connection.

10. The wearable intelligent system according to claim 1, wherein:
the change mode of the position with time includes at least a single click, a double click, or a slide.

11. The wearable intelligent system according to claim 1, wherein:
the operation commands include at least select, confirm, move, or unlock.

12. The wearable intelligent system according to claim 9, wherein:
the wireless connection includes Wi-Fi, Bluetooth, GPRS, WAP, HSCSD, EDGE, EPOC, WCDMA, CDMA200, or TD-CDMA.

13. An interaction method for using a wearable intelligent system, comprising:
providing an object and a wearable intelligent system at least having a micro projector, a beam splitter, a position sensor and a central data hub having interaction modes;
obtaining a position and a motion of the object using the position sensor and sending the position and the motion to the central data hub;
analyzing the position and the motion according to the interaction mode by the central data hub; and converting results from the analysis into a corresponding image data;
obtaining a calibration position by sensing at least a part of a user's body through the position sensor;
calibrating a target pattern projected by the micro projector according to the calibration position;
directly projecting an image onto a beam splitter by the micro projector according to the image data, wherein an optical axis of the micro projector points to the beam splitter;
forming a virtual image in at least one of the user's eyes and stacking the virtual image with a corresponding position of the object; and
controlling the micro projector and the beam splitter to match the image interface with the position of the part of the user's body.

14. The method according to claim 13, wherein:
the micro projector works with a head up display mode, or a movie mode.

15. The method according to claim 13, wherein:
a local database or a remote database is provided.

16. The method according to claim 15, wherein analyzing the position and the motion according to the interaction mode by the central data hub further includes:
calling a local database for a data support; or
calling a remote database for a data support.

17. The method according to claim 15, wherein:
a mode for calling a local database or a remote database is based on a direct wired connection, or a wireless connection including Wi-Fi, Bluetooth, GPRS, WAP, HSCSD, EDGE, EPOC, WCDMA, CDMA2000, or TD-CDMA.

18. The method according to claim 13, wherein:
the interaction mode includes a wresting mode, a dancing mode, a chess book mode, a card playing mode and a gaming mode.

19. The method according to claim 13, wherein:
the object includes a teammate or an opponent of a game, and attacker, a chess book or chess pieces, a table or cards.

20. The wearable intelligent system according to claim 1, wherein calibrating the target pattern comprising:
sending the target pattern by the micro projector;
forming a virtual image of the target pattern in the user's eye;
clicking the target pattern by the user using the part of the user's body;
recognizing the position of at least the part of the user's body;
calibrating a position of the target pattern with the position of at least the part of the user's body.

* * * * *